United States Patent
Hou et al.

(10) Patent No.: US 9,335,771 B2
(45) Date of Patent: May 10, 2016

(54) FEEDFORWARD CONTROL METHOD AND APPARATUS

(71) Applicant: Huawei Technologies Co., Ltd., Shenzhen (CN)

(72) Inventors: Zhaozheng Hou, Shenzhen (CN); Chao Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 14/330,706

(22) Filed: Jul. 14, 2014

(65) Prior Publication Data
US 2014/0327413 A1 Nov. 6, 2014

Related U.S. Application Data

(63) Continuation of application No. PCT/CN2013/085676, filed on Oct. 22, 2013.

(30) Foreign Application Priority Data

Dec. 31, 2012 (CN) .......................... 2012 1 0590554

(51) Int. Cl.
*H02M 3/157* (2006.01)
*G05F 1/10* (2006.01)
(Continued)

(52) U.S. Cl.
CPC .. *G05F 1/10* (2013.01); *G05F 1/46* (2013.01); *H02M 3/157* (2013.01); *H02M 3/33515* (2013.01); *H02M 2001/0022* (2013.01)

(58) Field of Classification Search
CPC .. H02M 2001/002; H02M 3/157; G05F 1/565
See application file for complete search history.

(56) References Cited

U.S. PATENT DOCUMENTS 6,674,379 B1 * 1/2004 Li ........................ G05B 21/02
                                                  341/123
7,180,439 B1 * 2/2007 Bakker ................ H02M 7/529
                                                  341/141
(Continued)

FOREIGN PATENT DOCUMENTS

CN          101109971 A       1/2008
CN          101159415 A       4/2008
(Continued)

OTHER PUBLICATIONS

Zhang, X., et al., "Digital PWM/PFM Controller with Input Voltage Feed-Forward for Synchronous Buck Converters," Twenty-Third Annual IEEE Applied Power Electronics Conference and Exposition, APEC, Feb. 24-28, 2008, pp. 523-528.
(Continued)

*Primary Examiner* — Harry Behm
(74) *Attorney, Agent, or Firm* — Conley Rose, P.C.; Grant Rodolph

(57) ABSTRACT

A feedforward control method, which includes: determining, whether the input voltage rapidly changes or slowly changes; when the input voltage rapidly changes, determining, a first feedforward gain coefficient corresponding to the difference between a input voltage reference value and a first input voltage measurement value acquired by a high-speed low-precision analog-to-digital converter in a current sampling period; when the input voltage slowly changes, determining a second feedforward gain coefficient which is a ratio of the input voltage reference value to a second input voltage measurement value acquired by a low-speed high-precision analog-to-digital converter in the current sampling period; and using the first or the second feedforward gain coefficient as a feedforward gain coefficient of a current input voltage, multiplying the feedforward gain coefficient by an output value of a feedback loop of an output voltage, so as to control stable output of the output voltage.

18 Claims, 5 Drawing Sheets

(51) Int. Cl.
*G05F 1/46* (2006.01)
*H02M 3/335* (2006.01)
*H02M 1/00* (2006.01)

(56) References Cited

U.S. PATENT DOCUMENTS

| | | | |
|---|---|---|---|
| 7,232,506 | B2 | 6/2007 | George et al. |
| 2005/0270813 | A1 | 12/2005 | Zhang et al. |
| 2006/0171182 | A1 | 8/2006 | Siri et al. |
| 2008/0048629 | A1 | 2/2008 | Suzuki |
| 2008/0062731 | A1 | 3/2008 | Chang et al. |
| 2009/0091482 | A1 | 4/2009 | Oshima et al. |
| 2009/0118873 | A1 | 5/2009 | Cheng et al. |
| 2010/0066574 | A1* | 3/2010 | Bhakta .......... H02M 3/157 341/118 |
| 2010/0097254 | A1* | 4/2010 | Huang .......... H02M 3/157 341/142 |
| 2010/0131219 | A1* | 5/2010 | Kenly .......... G01R 19/0092 702/64 |
| 2012/0049908 | A1* | 3/2012 | Karlsson .......... H02M 3/157 327/154 |
| 2013/0094259 | A1* | 4/2013 | Kurokawa .......... H02M 7/44 363/95 |
| 2013/0223105 | A1 | 8/2013 | Baurle et al. |
| 2015/0029760 | A1* | 1/2015 | Karlsson .......... H02M 1/08 363/17 |

FOREIGN PATENT DOCUMENTS

| | | |
|---|---|---|
| CN | 101424918 A | 5/2009 |
| CN | 101853040 A | 10/2010 |
| CN | 102035366 A | 4/2011 |
| CN | 102730054 A | 10/2012 |
| CN | 102981540 A | 3/2013 |
| JP | 0669289 B2 | 8/1994 |
| JP | 0797297 B2 | 10/1995 |
| JP | 20100066587 A | 3/2010 |

OTHER PUBLICATIONS

Karlsson, M., et al., "Efficient Voltage Feed-Forward Algorithms for Switched Mode Power Supplies," Twenty-Sixth Annual IEEE Applied Power Electronics Conference and Exposition, APEC, Mar. 6-11, 2011, pp. 1743-1747.
Xu, S., et al., "Digital Voltage Feed-Forward Control for Isolated DC/DC Converters," Twenty-Eighth Annual IEEE Applied Power Electronics Conference and Exposition (APEC), Mar. 17-21, 2013, pp. 2112-2117.
Foreign Communication From A Counterpart Application, European Application No. 13863699.8, Extended European Search Report dated Jan. 26, 2015, 9 pages.
Partial English Translation and Abstract of Chinese Patent Application No. CN102981540A, Aug. 26, 2014, 10 pages.
Foreign Communication From A Counterpart Application, PCT Application No. PCT/CN2013/085676, English Translation of International Search Report dated Jan. 30, 2014, 3 pages.
Foreign Communication From A Counterpart Application, PCT Application No. PCT/CN2013/085676, Written Opinion dated Jan. 30, 2014, 6 pages.
Foreign Communication From A Counterpart Application, Chinese Application No. 201210590554.2, Chinese Office Action dated Mar. 28, 2014, 5 pages.

* cited by examiner

FEEDFORWARD CONTROL METHOD AND APPARATUS

CROSS-REFERENCE TO RELATED APPLICATIONS

This application is a continuation of International Application No. PCT/CN2013/085676, filed on Oct. 22, 2013, which claims priority to Chinese Patent Application No. 201210590554.2, filed on Dec. 31, 2012, both of which are hereby incorporated by reference in their entireties.

TECHNICAL FIELD

Embodiments of the present invention relate to the field of communications technologies, and in particular, to a feedforward control method and apparatus.

BACKGROUND

A common power supply outputs a constant voltage. Disturbance, for example, input disturbance and output disturbance, needs to be suppressed to stabilize an output voltage of the power supply. Generally, a feedforward technology is used to suppress the input disturbance.

At present, most digital power feedforward technologies cannot meet requirements under various change slopes of an input voltage. Generally, when the input voltage changes slowly, timely sampling of the input voltage that rapidly changes cannot be implemented, resulting in a large fluctuation of the output voltage when the input voltage rapidly changes. Generally, when the input voltage changes rapidly, precision of sampling of the input voltage that slowly changes is insufficient, resulting in a small fluctuation of the output voltage when the input voltage slowly changes and causes a poor feedforward effect.

SUMMARY

An objective of the embodiments of the present invention is to provide a feedforward control method and apparatus, so as to suppress an impact of input voltage disturbance on an output voltage when the input voltage rapidly changes or slowly changes.

The objective of the embodiments of the present invention is achieved using the following technical solutions:

According to a first aspect, an embodiment of the present invention provides a feedforward control method, including: determining, according to a difference between an input voltage reference value and an input voltage measurement value acquired by a high-speed low-precision analog-to-digital converter by means of periodic sampling, whether the input voltage rapidly changes or slowly changes; when it is determined that the input voltage rapidly changes, determining, from an information table, a first feedforward gain coefficient corresponding to the difference according to a difference between the input voltage reference value and a first input voltage measurement value and acquired by the high-speed low-precision analog-to-digital converter in a current sampling period; when it is determined that the input voltage slowly changes, determining that a ratio of the input voltage reference value to a second input voltage measurement value acquired by a low-speed high-precision analog-to-digital converter in the current sampling period is a second feedforward gain coefficient; and using the first feedforward gain coefficient or the second feedforward gain coefficient as a feedforward gain coefficient of a current input voltage, multiplying the feedforward gain coefficient of the current input voltage by an output value of a feedback loop of an output voltage to acquire a multiplication result, and converting the multiplication result to a control signal to control stable output of the output voltage.

With reference to the first aspect, in a first implementation manner, the determining, according to a difference between an input voltage reference value and an input voltage measurement value acquired by a high-speed low-precision analog-to-digital converter by means of periodic sampling, whether the input voltage rapidly changes or slowly changes includes: periodic sampling, by the high-speed low-precision analog-to-digital converter, of the input voltage, and acquiring a corresponding input voltage measurement value in each sampling period; calculating a difference between the input voltage reference value and a measurement value of an input voltage corresponding to each sampling period; performing a difference calculation on a difference of the current sampling period and a difference of a previous sampling period to acquire a difference calculation result; and when an absolute value of the difference calculation result is greater than a first threshold, determining that the input voltage rapidly changes; otherwise, determining that the input voltage slowly changes.

With reference to the first aspect or the first implementation manner of the first aspect, in a second implementation manner, a difference calculation is performed on the second feedforward gain coefficient and the feedforward gain coefficient of the current input voltage to acquire a difference calculation result; and when an absolute value of the difference calculation result is greater than a second threshold, the feedforward gain coefficient of the current input voltage is regulated step by step to the second feedforward gain coefficient by a minimum step, or the feedforward gain coefficient of the current input voltage is regulated step by step by a minimum step to make a difference between the feedforward gain coefficient of the current input voltage and the second feedforward gain coefficient less than or equal to the second threshold; otherwise, the feedforward gain coefficient of the current input voltage remains unchanged.

With reference to the first aspect or the first implementation manner or the second implementation manner of the first aspect, in a third implementation manner, a sampling period of the high-speed low-precision analog-to-digital converter is shorter than a sampling period of the low-speed high-precision analog-to-digital converter; the high-speed low-precision analog-to-digital converter includes an error analog-to-digital converter (EADC), or a pipeline analog-to-digital converter (ADC); and the low-speed high-precision analog-to-digital converter includes a successive approximation register analog-to-digital converter (SARADC) or a Sigma-Delta analog-to-digital converter ($\Sigma$-$\Delta$ ADC).

According to a second aspect, an embodiment of the present invention provides a feedforward control apparatus, including: a high-speed low-precision analog-to-digital converter configured to periodically sample an input voltage to acquire a measurement value of the input voltage and acquire a first input voltage measurement value in a current sampling period by means of sampling; a determining unit, connected to the high-speed low-precision analog-to-digital converter and configured to determine, according to a difference between an input voltage reference value and the input voltage measurement value acquired by the high-speed low-precision analog-to-digital converter by means of periodic sampling, whether the input voltage rapidly changes or slowly changes; a first control unit, connected to the determining unit and the high-speed low-precision analog-to-digital converter and configured to: when it is determined that the input voltage rapidly changes, determine, from an information table, a first feedforward gain coefficient corresponding to the difference according to a difference between the input voltage reference value and the first input voltage measurement value acquired by the high-speed low-precision analog-to-digital converter in the current sampling period; a low-speed high-precision analog-to-digital converter configured to acquire a second input voltage measurement value in a current sampling period by means of sampling; a second control unit, connected to the determining unit and the low-speed high-precision analog-to-digital converter and configured to: when it is determined that the input voltage slowly changes, determine that a ratio of the input voltage reference value to the second input voltage measurement value acquired by the low-speed high-precision analog-to-digital converter in the current sampling period is a second feedforward gain coefficient; and a third control unit, connected to the first control unit and the second control unit, and configured to use the first feedforward gain coefficient or the second feedforward gain coefficient as a feedforward gain coefficient of a current input voltage, multiply the feedforward gain coefficient of the current input voltage by an output value of a feedback loop of an output voltage to acquire a multiplication result, and convert the multiplication result to a control signal to control stable output of the output voltage.

With reference to the second aspect, in a first implementation manner, the determining unit is configured to: calculate a difference between the input voltage reference value and a measurement value of an input voltage corresponding to each sampling period, where the measurement value of the input voltage corresponding to each sampling period is acquired by the high-speed low-precision analog-to-digital converter by means of periodic sampling of the input voltage; perform a difference calculation on a difference in the current sampling period and a difference in a previous sampling period to acquire a difference calculation result; and when an absolute value of the difference calculation result is greater than a first threshold, determine that the input voltage rapidly changes; otherwise, determine that the input voltage slowly changes.

With reference to the second aspect or the first implementation manner of the second aspect, in a second implementation manner, the second control unit is further configured to: perform a difference calculation on the second feedforward gain coefficient and the feedforward gain coefficient of the current input voltage to acquire a difference calculation result; and when an absolute value of the difference calculation result is greater than a second threshold, regulate, step by step, the feedforward gain coefficient of the current input voltage to the second feedforward gain coefficient by a minimum step, or regulate, step by step, the feedforward gain coefficient of the current input voltage by a minimum step to make a difference between the feedforward gain coefficient of the current input voltage and the second feedforward gain coefficient less than or equal to the second threshold; otherwise, maintain the feedforward gain coefficient of the current input voltage unchanged.

With reference to the second aspect or the first implementation manner or the second implementation manner of the second aspect, in a third implementation manner, a sampling period of the high-speed low-precision analog-to-digital converter is shorter than a sampling period of the low-speed high-precision analog-to-digital converter; the high-speed low-precision analog-to-digital converter includes an EADC, or a pipeline ADC; and the low-speed high-precision ADC includes a SARADC or a Σ-Δ ADC.

It can be seen that, in the feedforward control method and apparatus provided by the embodiments of the present invention, it is determined, according to a difference between an input voltage reference value and an input voltage measurement value acquired by a high-speed low-precision analog-to-digital converter by means of periodical sampling, whether the input voltage rapidly changes or slowly changes; when it is determined that the input voltage rapidly changes, a first feedforward gain coefficient corresponding to the difference is determined, from an information table, according to a difference between the input voltage reference value and a first input voltage measurement value acquired by the high-speed low-precision analog-to-digital converter in a current sampling period; when it is determined that the input voltage slowly changes, it is determined that a ratio of the input voltage reference value to a second input voltage measurement value acquired by a low-speed high-precision analog-to-digital converter in the current sampling period is a second feedforward gain coefficient; and the first feedforward gain coefficient or the second feedforward gain coefficient is used as a feedforward gain coefficient of a current input voltage in a case that an input voltage rapidly changes or slowly changes, the feedforward gain coefficient of the current input voltage is multiplied by an output value of a feedback loop of an output voltage to acquire a multiplication result, and the multiplication result is converted to a control signal, thereby effectively controlling continuity time of a switch component using the control signal and achieving stable output of the output voltage.

BRIEF DESCRIPTION OF DRAWINGS

To describe the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part, rather than all, of the embodiments of the present invention. All other embodiments obtained by a person of ordinary skill in the art based on the embodiments of the present invention without creative efforts shall fall within the protection scope of the present invention.

Figure 1:
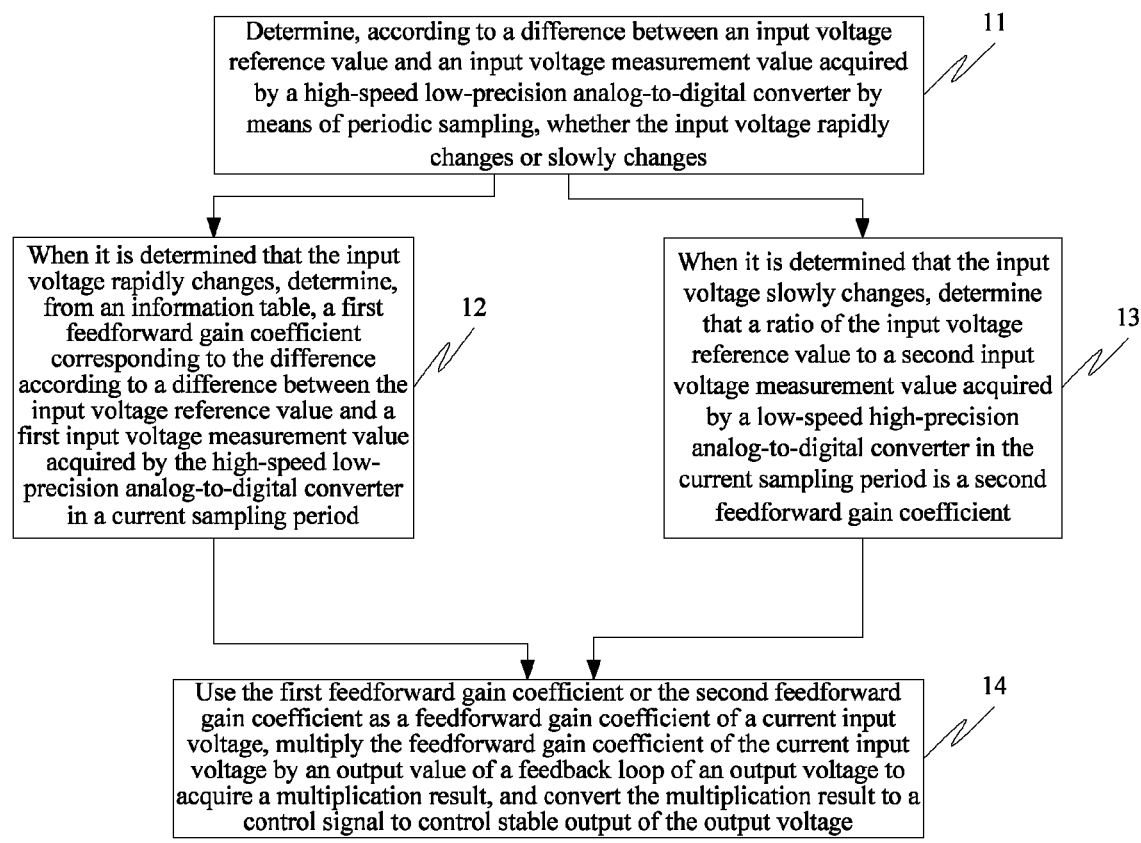
FIG. 1 is a schematic flowchart of a feedforward control method according to an embodiment of the present invention.

As shown in FIG. 1, an embodiment of the present invention provides a feedforward control method, including the following steps:

Step 11: Determine, according to a difference between an input voltage reference value and an input voltage measurement value acquired by a high-speed low-precision analog-to-digital converter by means of periodic sampling, whether the input voltage rapidly changes or slowly changes.

Step 12: When it is determined that the input voltage rapidly changes, determine, from an information table, a first feedforward gain coefficient corresponding to the difference according to a difference between the input voltage reference value and a first input voltage measurement value acquired by the high-speed low-precision analog-to-digital converter in a current sampling period.

The information table includes a correspondence between the difference and the first feedforward gain coefficient. The information table may be implemented as a Look Up Table (LUT).

Step 13: When it is determined that the input voltage slowly changes, determine that a ratio of the input voltage reference value to a second input voltage measurement value acquired by a low-speed high-precision analog-to-digital converter in the current sampling period is a second feedforward gain coefficient.

Step 14: Use the first feedforward gain coefficient or the second feedforward gain coefficient as a feedforward gain coefficient of a current input voltage, multiply the feedforward gain coefficient of the current input voltage by an output value of a feedback loop of an output voltage to acquire a multiplication result, and convert the multiplication result to a control signal to control stable output of the output voltage.

It can be seen that, in the feedforward control method and apparatus provided by the embodiments of the present invention, it is determined, according to a difference between an input voltage reference value and an input voltage measurement value acquired by a high-speed low-precision analog-to-digital converter by means of periodic sampling, whether the input voltage rapidly changes or slowly changes, when it is determined that the input voltage rapidly changes, a first feedforward gain coefficient corresponding to the difference is determined, from an information table (such as a LUT), according to a difference between the input voltage reference value and a first input voltage measurement value acquired by the high-speed low-precision analog-to-digital converter in a current sampling period, when it is determined that the input voltage slowly changes, a ratio of the input voltage reference value to a second input voltage measurement value acquired by a low-speed high-precision analog-to-digital converter in the current sampling period is a second feedforward gain coefficient, and the first feedforward gain coefficient or the second feedforward gain coefficient is used as a feedforward gain coefficient of a current input voltage. In a case where an input voltage rapidly changes or slowly changes, the feedforward gain coefficient of the current input voltage is multiplied by an output value of a feedback loop of an output voltage to acquire a multiplication result, and the multiplication result is converted to a control signal, thereby effectively using the control signal to implement control on stable output of the output voltage.

Because in the feedforward control method provided by the embodiments of the present invention, the high-speed low-precision analog-to-digital converter is used to work with the low-speed high-precision analog-to-digital converter, instead of using the high-precision analog-to-digital converter only, an impact of input voltage disturbance on the output voltage is effectively and simply suppressed with a lower hardware cost.

In the feedforward control method provided by the embodiments of the present invention, various input voltage variation scenarios of a 48 volt (V) bus bar power supply can be taken into account, thereby achieving a wide application scope and an obvious practical effect.

In the feedforward control method according to the embodiments of the present invention, the high-speed low-precision analog-to-digital converter may be an analog-to-digital converter that meets the following requirements: (1) a sampling frequency higher than 1 MHz (megahertz), and/or (2) a bit width less than 9 bit and a highest precision of a reference voltage higher than 1 millivolt/least significant bit (mv/Lsb).

For example, the high-speed low-precision analog-to-digital converter may include an EADC or a pipeline ADC.

The low-speed high-precision analog-to-digital converter may be an analog-to-digital converter that meets the following requirements: (1) a sampling frequency less than or equal to 1 MHz, and/or (2) a bit width more than 9 bit and a precision of a reference voltage higher than 1 mv/Lsb.

For example, the low-speed high-precision analog-to-digital converter may include an SARADC or a $\Sigma$-$\Delta$ ADC.

It can be seen that a sampling period of the high-speed low-precision analog-to-digital converter is shorter than a sampling period of the low-speed high-precision analog-to-digital converter, and the sampling period of the high-speed low-precision analog-to-digital converter may be much shorter than the sampling period of the low-speed high-precision analog-to-digital converter. The sampling period of the high-speed low-precision analog-to-digital converter may meet or exceed a requirement for performing sampling in each switch period (a switch frequency ranges from 100 kilohertz (kHz) to 2 MHz).

In the feedforward control method provided by the embodiments of the present invention, an output value of a feedback loop of the output voltage is a currently calculated duty cycle of the feedback loop. A result obtained by multiplying the feedforward gain coefficient, which is of the current input voltage and acquired according to the feedforward control method provided by the embodiments of the present invention, by the output value is used as an input of a Digital Pulse Width Modulation (DPWM) phase. The multiplication result is converted to a control signal by means of DPWM, and the control signal is used to control continuity time of the switch component, thereby achieving stable output of the output voltage. The DPWM herein is only used as an example for description. A generation method of a control signal may also be Pulse frequency modulation or another method, which is not limited by the embodiments of the present invention. For details about the feedback loop and duty cycle, reference may be made to the related existing technologies, and details are not repeatedly described herein.

Further, the determining, according to a difference between an input voltage reference value and an input voltage measurement value acquired by a high-speed low-precision analog-to-digital converter by means of periodic sampling, whether the input voltage rapidly changes or slowly changes in step 11 may include periodic sampling, by the high-speed low-precision analog-to-digital converter, the input voltage, and acquiring a corresponding input voltage measurement value in each sampling period, calculating a difference between the input voltage reference value and a measurement value of an input voltage corresponding to each sampling period, performing a difference calculation on a difference of the current sampling period and a difference of a previous sampling period to acquire a difference calculation result, and when an absolute value of the difference calculation result is greater than a first threshold, determining that the input voltage rapidly changes, otherwise, determining that the input voltage slowly changes.

The input voltage reference value may be a preset value and may be an intermediate value within a value range of the input voltage. The value range of the input voltage and a value may be preset. The difference between the input voltage reference value and the measurement value of the input voltage corresponding to each sampling period may be a positive number or a negative number. The first threshold may be adjusted according to a detection requirement of the input voltage.

Further, a correspondence between the difference and the first feedforward gain coefficient may be pre-established in the LUT. The first feedforward gain coefficient may be stored in a feedforward gain coefficient register. A process of establishing the LUT may be as described below.

Figure 2:
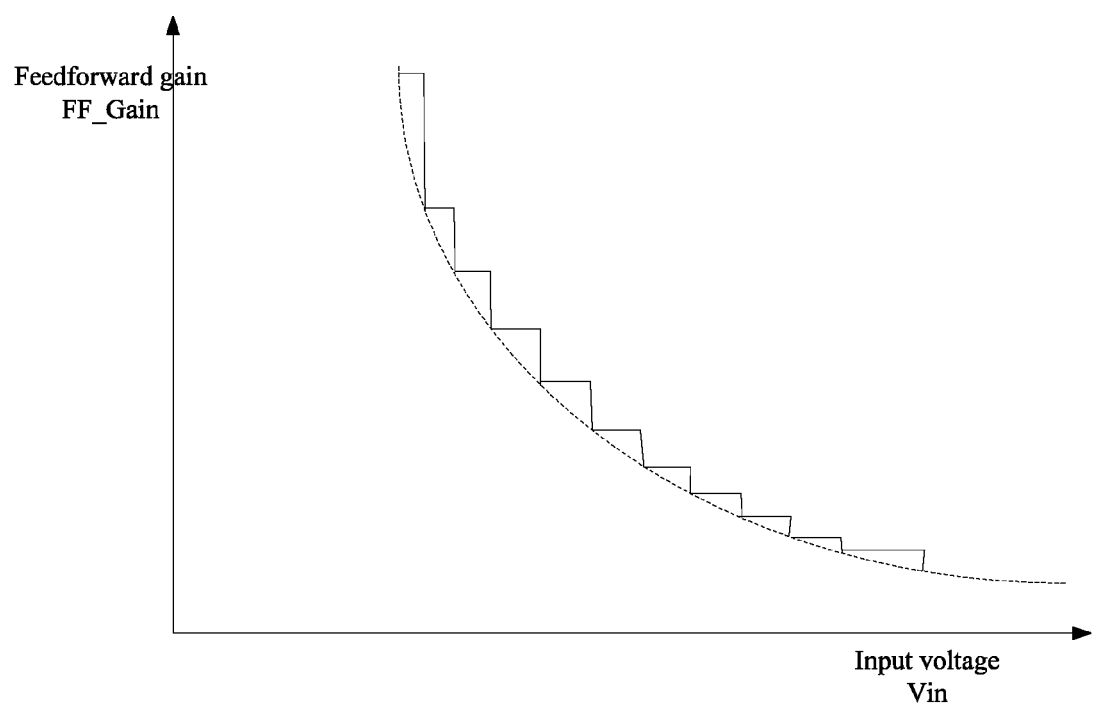
FIG. 2 is a schematic diagram of a relationship between a feedforward gain coefficient and an input voltage according to an embodiment of the present invention.

According to the preset value of the input voltage and the preset input voltage reference value, a result is calculated by dividing the input voltage reference value by the preset value of the input voltage, and the calculation result is used as the first feedforward gain coefficient. When the correspondence between the difference between the input voltage reference value and the preset value of the input voltage and the first feedforward gain coefficient is established, the difference between the input voltage reference value and the preset value of the input voltage is used as the input of the LUT, and the first feedforward gain coefficient as the output of the LUT. In this correspondence, the difference between the input voltage reference value and the preset value of the input voltage may be a specific value or may also be a value range. That is, one feedforward gain coefficient may correspond to one difference range, for example, differences within a range of 0.03 V to 0.05 V correspond to the same feedforward gain coefficient. For example, the correspondence may be, as shown in FIG. 2, when the input voltage changes, the difference between the input voltage reference value and the input voltage changes accordingly, and the output of the LUT also changes accordingly. Therefore, an approximate inverse proportion relationship between the feedforward gain coefficient FF_Gain and the input voltage is substantially achieved. As shown in FIG. 2, when the input voltage changes within a small range, the feedforward gain coefficient FF_Gain may remain unchanged, that is, the difference between the input voltage reference value and the input voltage, within a range, may correspond to the same feedforward gain coefficient FF_Gain.

It can be seen that, when the high-speed low-precision analog-to-digital converter periodically samples the input voltage, a first input voltage measurement value acquired in the current sampling period represents a current input voltage value, and the first feedforward gain coefficient is acquired by searching the LUT table according to the difference between the input voltage reference value and the first input voltage measurement value. Using the LUT, when the input voltage rapidly changes, the feedforward gain coefficient corresponding to the current input voltage is immediately acquired.

In step 13, when it is determined that the input voltage slowly changes, a ratio of the input voltage reference value to the second input voltage measurement value acquired by a low-speed high-precision analog-to-digital converter in the current sampling period is determined as a second feedforward gain coefficient. The second feedforward gain coefficient may be stored in the feedforward gain coefficient register.

It can be seen that, because a sampling resolution of the low-speed high-precision analog-to-digital converter may reach a higher precision, the second feedforward gain coefficient acquired by calculation may reach a higher precision when the input voltage slowly changes.

Optionally, the feedforward control method provided by the embodiments of the present invention may further include performing a difference calculation on the second feedforward gain coefficient and the feedforward gain coefficient of the current input voltage to acquire a difference calculation result, and when an absolute value of the difference calculation result is greater than a second threshold, regulating, step by step, the feedforward gain coefficient of the current input voltage to the second feedforward gain coefficient by a minimum step, or regulating, step by step, the feedforward gain coefficient of the current input voltage by a minimum step to make a difference between the feedforward gain coefficient of the current input voltage and the second feedforward gain coefficient less than or equal to the second threshold, otherwise, maintaining the feedforward gain coefficient of the current input voltage unchanged.

The second threshold may be adjusted according to a requirement. The minimum step for regulation is determined by a bit width of a feedforward gain coefficient register. The larger the bit width, the higher the precision. The regulated feedforward gain coefficient may be stored in the feedforward gain coefficient register.

It can be seen that, if the absolute value of the difference calculation result is greater than the second threshold, the feedforward gain coefficient of the current input voltage is regulated step by step to the second feedforward gain coefficient by a minimum step, or the feedforward gain coefficient of the current input voltage is regulated step by step by a minimum step to make a difference between the feedforward gain coefficient of the current input voltage and the second feedforward gain coefficient less than or equal to the second threshold, so as to ensure that the feedforward gain coefficient does not have a larger step and suppress a greater fluctuation of the output voltage; if the absolute value of the difference calculation result is less than or equal to the second threshold, regulation is not required and the current feedforward gain coefficient still remains unchanged.

Figure 3:
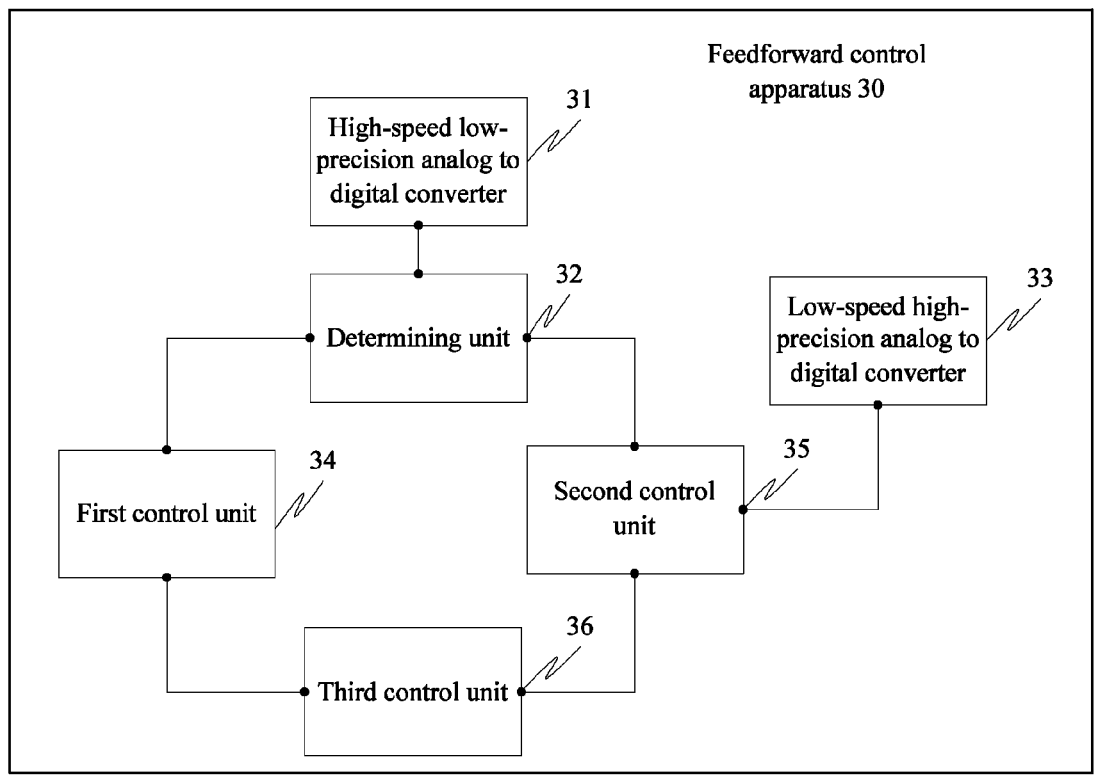
FIG. 3 is a schematic structural diagram of a feedforward control apparatus according to an embodiment of the present invention.

As shown in FIG. 3, an embodiment of the present invention provides a feedforward control apparatus 30, including a high-speed low-precision analog-to-digital converter 31 configured to periodically sample an input voltage to acquire a measurement value of the input voltage and acquire a first input voltage measurement value in a current sampling period by means of sampling, a determining unit 32, connected to the high-speed low-precision analog-to-digital converter 31 and configured to determine, according to a difference between an input voltage reference value and the input voltage measurement value acquired by the high-speed low-precision analog-to-digital converter by means of periodic sampling, whether the input voltage rapidly changes or slowly changes, a low-speed high-precision analog-to-digital converter 33, connected to a second control unit 35 and configured to acquire a second input voltage measurement value in a current sampling period by means of sampling, a first control unit 34, connected to the determining unit 32 and the high-speed low-precision analog-to-digital converter 31 and configured to when it is determined that the input voltage rapidly changes, determine, from an information table, a first feedforward gain coefficient corresponding to the difference according to a difference between the input voltage reference value and the first input voltage measurement value acquired by the high-speed low-precision analog-to-digital converter 31 in a current sampling period, a second control unit 35, connected to the determining unit 32 and the low-speed high-precision analog-to-digital converter 33 and configured to when it is determined that the input voltage slowly changes, determine that a ratio of the input voltage reference value to the second input voltage measurement value acquired by the low-speed high-precision analog-to-digital converter 33 in the current sampling period is a second feedforward gain coefficient, and a third control unit 36, connected to the first control unit 34 and the second control unit 35, and configured to use the first feedforward gain coefficient or the second feedforward gain coefficient as a feedforward gain coefficient of a current input voltage, multiply the feedforward gain coefficient of the current input voltage by an output value of a feedback loop of an output voltage to acquire a multiplication result, and convert the multiplication result to a control signal to control stable output of the output voltage.

It can be seen from the foregoing technical solution provided by the present invention, when it is determined that an input voltage rapidly changes, a first feedforward gain coefficient, which is corresponding to a difference between an input voltage reference value and a first input voltage measurement value acquired by a high-speed low-precision analog-to-digital converter, is determined from an information table according to the difference, when it is determined that the input voltage slowly changes, a second feedforward gain coefficient is determined according to a ratio of the input voltage reference value to a second input voltage measurement value acquired by a low-speed high-precision analog-to-digital converter by means of periodic sampling, and a product of the feedforward gain coefficient and a calculation result of a feedback loop remains unchanged, thereby implementing suppression of an impact of input voltage disturbance on the output voltage when the input voltage rapidly changes or slowly changes. Moreover, because the high-speed low-precision analog-to-digital converter is used to work with the low-speed high-precision analog-to-digital converter, instead of using the high-precision analog-to-digital converter only, an impact of input voltage disturbance on the output voltage is effectively and simply suppressed with a lower hardware cost.

In the feedforward control apparatus provided by the embodiments of the present invention, various input voltage variation scenarios of a 48 V busbar power supply can be taken into account, thereby achieving a wide application scope and an obvious practical effect.

In the feedforward control apparatus according to the embodiments of the present invention, the high-speed low-precision analog-to-digital converter 31 may be an analog-to-digital converter that meets the following requirements: (1) a sampling frequency higher than 1 MHz, and/or (2) a bit width less than 9 bit and a highest precision of a reference voltage higher than 1 mv/Lsb.

For example, the high-speed low-precision analog-to-digital converter may include an EADC or a pipeline ADC.

The low-speed high-precision analog-to-digital converter may be an analog-to-digital converter that meets the following requirements: (1) a sampling frequency less than or equal to 1 MHz, and/or (2) a bit width more than 9 bit and a precision of a reference voltage higher than 1 mv/Lsb.

For example, the low-speed high-precision analog-to-digital converter 34 may include an SARADC or a Σ-Δ ADC.

It can be seen that, the sampling period of the high-speed low-precision analog-to-digital converter is shorter than the sampling period of the low-speed high-precision analog-to-digital converter, and the sampling period of the high-speed low-precision analog-to-digital converter may be much shorter than the sampling period of the low-speed high-precision analog-to-digital converter. The sampling period of the high-speed low-precision analog-to-digital converter may meet or exceed a requirement for performing sampling in each switch period (a switch frequency ranges from 100 kHz to 2 MHz).

In the feedforward control method provided by the embodiments of the present invention, an output value of a feedback loop of the output voltage is a currently calculated duty cycle of the feedback loop. A result obtained by multiplying the feedforward gain coefficient, which is of the current input voltage and acquired according to the feedforward control method provided by the embodiments of the present invention, by the output value is used as an input of a DPWM phase. The multiplication result is converted to a control signal by means of DPWM, and the control signal is used to control continuity time of the switch component, thereby achieving stable output of the output voltage. The DPWM herein is only used as an example for description. A generation method of a control signal may also be Pulse frequency modulation or another method, which is not limited by the embodiments of the present invention. For details about the feedback loop and duty cycle, reference may be made to the related existing technologies, and details are not repeatedly described herein.

Further, the high-speed low-precision analog-to-digital converter 31 periodically samples the input voltage, and acquires a corresponding input voltage measurement value in each sampling period.

At this time, the determining unit 32 is configured to calculate a difference between the input voltage reference value and the measurement value of the input voltage corresponding to each sampling period, perform a difference calculation on a difference of the current sampling period and a difference of a previous sampling period to acquire a difference calculation result, and when an absolute value of the difference calculation result is greater than a first threshold, determine that the input voltage rapidly changes, otherwise, determine that the input voltage slowly changes.

The input voltage reference value may be a preset value and may be an intermediate value within a value range of the input voltage. The value range of the input voltage and a value may be preset. The difference between the input voltage reference value and the measurement value of the input voltage corresponding to each sampling period may be a positive number or a negative number. The first threshold may be adjusted according to a detection requirement of the input voltage.

Optionally, the feedforward control apparatus provided by the embodiments of the present invention may further include a LUT establishment unit configured to calculate, according to the preset value of the input voltage and the preset input voltage reference value, a result by dividing the input voltage reference value by the preset value of the input voltage, use the calculation result as the first feedforward gain coefficient, and establish a correspondence between the difference between the input voltage reference value and the preset value of the input voltage and the first feedforward gain coefficient, using the difference between the input voltage reference value and the preset value of the input voltage as the input of the LUT, and the first feedforward gain coefficient as the output of the LUT. For specific description of the LUT, reference may be made to the description of the foregoing method embodiment, and details are not repeatedly described herein.

It can be seen that, when the high-speed low-precision analog-to-digital converter periodically samples the input voltage, a first input voltage measurement value acquired in the current sampling period represents the current input voltage value, and the first feedforward gain coefficient is acquired by searching the LUT table according to the difference between the input voltage reference value and the first input voltage measurement value. Using the LUT, the first control unit 34 can implement quick output of the feedforward gain coefficient corresponding to the current input voltage. Because a sampling resolution of the low-speed high-precision analog-to-digital converter may reach a higher precision, the second feedforward gain coefficient acquired by the second control unit 35 by calculation may reach a higher precision when the input voltage slowly changes.

Further, the second control unit 35 may be further configured to perform a difference calculation on the second feedforward gain coefficient and the feedforward gain coefficient of the current input voltage to acquire a difference calculation result, and when an absolute value of the difference calculation result is greater than a second threshold, regulate, step by step, the feedforward gain coefficient of the current input voltage to the second feedforward gain coefficient by a minimum step, or regulate, step by step, the feedforward gain coefficient of the current input voltage by a minimum step to make a difference between the feedforward gain coefficient of the current input voltage and the second feedforward gain coefficient less than or equal to the second threshold, otherwise, maintain the feedforward gain coefficient of the current input voltage unchanged.

The second threshold may be adjusted according to a requirement. The minimum step for regulation is determined by a bit width of a feedforward gain coefficient register. The larger the bit width, the higher the precision. The regulated feedforward gain coefficient may be stored in the feedforward gain coefficient register.

Figure 4A:
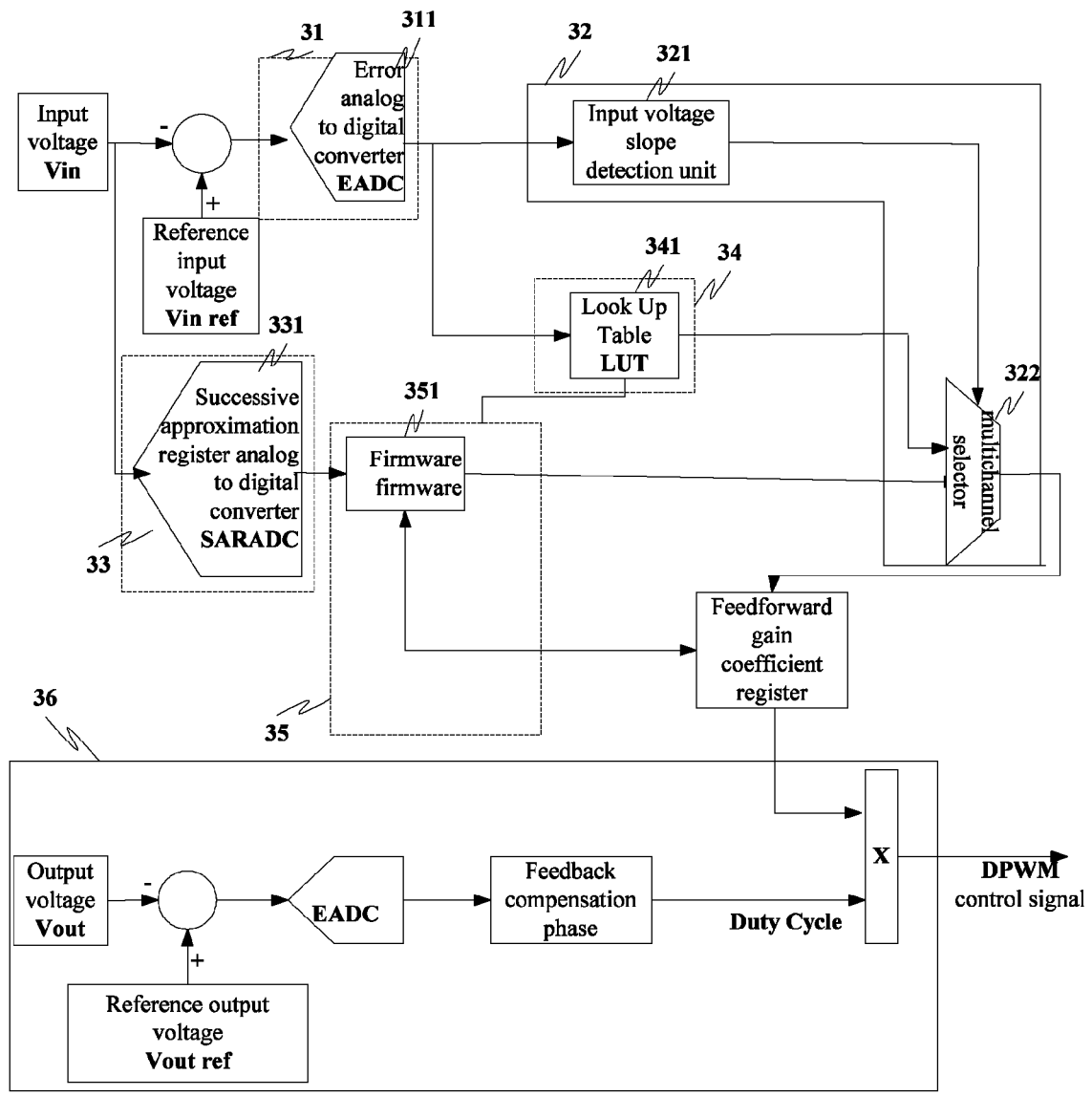
FIG. 4A is a schematic structural diagram of another feedforward control apparatus according to an embodiment of the present invention.

As shown in FIG. 4A, an embodiment of the present invention provides a feedforward control apparatus, including an EADC 311, an input voltage slope detection unit 321, a LUT 341, an SARADC 331, a firmware 351, a multichannel selector 322, and a third control unit 36.

The EADC 311 is configured to sample an error between a reference value (Vin ref) of the input voltage and a measurement value of the input voltage in each switch period, and quantize the error to a digital signal value.

The input voltage slope detection unit 321 is configured to generate an input voltage slope signal based on the digital signal value output by the EADC 311 and distinguish a rapid or slow change of the input voltage. The input voltage slope signal may be understood as a difference between the difference between the reference value (Vin ref) of the input voltage and the measurement value of the input voltage in the current switch period, and the difference between the reference value (Vin ref) of the input voltage and the measurement value of the input voltage in the previous switch period, which represents an input voltage slope.

Figure 4B:
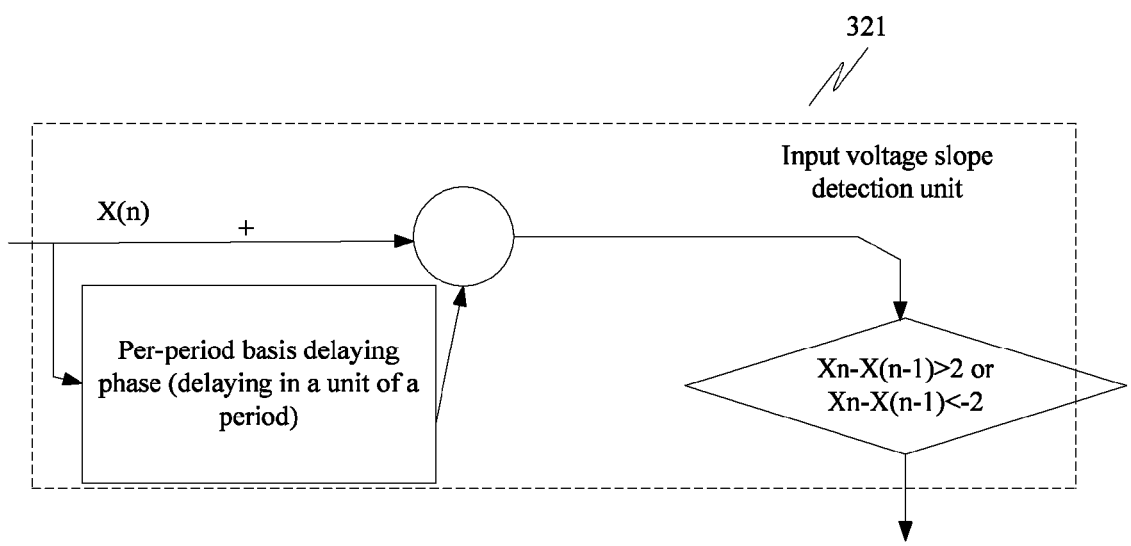
FIG. 4B is a schematic structural diagram of an input voltage slope detection unit of a feedforward control apparatus according to an embodiment of the present invention.

Further, the EADC 311 rapidly samples the input voltage (Vin) using the switch period as a sampling clock, and acquires a difference signal between the reference value (Vin ref) of the input voltage and the first input voltage measurement value in each period, namely, X(n). Referring to FIG. 4B, after completing the difference calculation in the current period, the input voltage slope detection unit 321 performs a difference calculation on the difference of the current switch period and the difference of the previous switch period (a result obtained by delaying the current switch period in a unit of a period, that is, X(n−1)). If an absolute value of the difference operation result is greater than a certain threshold (which is, for example, 2, and this threshold may be adjusted according to a requirement for input voltage (Vin) slope detection), it indicates that the input voltage rapidly changes, otherwise, it indicates that the input voltage slowly changes.

The LUT 341 is configured to search a table to obtain a first feedforward gain coefficient according to a value of the digital signal output by the EADC 311.

A process of implementing the LUT includes, according to the preset value of the input voltage and the preset input voltage reference value, dividing the input voltage reference value by the value of the input voltage to acquire the first feedforward gain coefficient, and establishing the correspondence between the difference between the input voltage reference value and the value of the input voltage and the first feedforward gain coefficient, using the difference between the input voltage reference value and the value of the input voltage as the input of the LUT and the first feedforward gain coefficient as the output of the LUT.

It is assumed that Vout=Vin×Duty Cycle×FF_Gain, that is, FF_Gain=Vout/(Vin×Duty_Cycle). When the input voltage Vin changes, the Duty_Cycle of an output feedback loop does not change and substantially remains unchanged. In order to maintain an output voltage (Vout) substantially unchanged and stabilize the output, a feedforward gain coefficient FF_Gain is in an inverse proportion relationship with the input voltage (Vin).

However, in a digital controller, a long calculation period of time is required to achieve a division requirement, and consequently cannot meet a requirement for suppressing an impact of input voltage disturbance on the output voltage when the input voltage rapidly changes. Therefore, a LUT-based fitting manner is used to achieve a fact that the FF_Gain_fast (fast feedforward gain coefficient, or the first feedforward gain coefficient) is a fixed gain when the input voltage (Vin) is within a certain range.

Further, a value of FF_Gain_fast is determined according to the value of the input voltage (Vin) based on FF_Gain_fast=Vin ref/Vin. When the reference value (Vin) ref of the input voltage does not change and the input voltage (Vin) changes, the difference between the reference value (Vin ref) of the input voltage and the input voltage (Vin) changes accordingly, and therefore FF_Gain_fast also changes. This difference corresponds to FF_Gain_fast, which is used as the input and output of the LUT to establish the LUT, that is, the input of the LUT is the difference between the reference value (Vin ref) of the input voltage and the input voltage (Vin), and the output of the LUT is the FF_Gain_fast.

However, the first input voltage measurement value acquired when the EADC 311 rapidly samples the input voltage (Vin) is Vin_eadc. When it is detected that the input voltage (Vin) rapidly changes, a corresponding feedforward gain coefficient is directly acquired by looking up the table according to a sampling difference of the EADC 311.

The following describes the process of implementing the LUT, which is subject to the following two limitations in the digital controller: (1) the bit width of the LUT is limited. A higher bit width means a higher cost. A LUT with a bit width being 6 bits is selected as an example, and/or (2) when a calculation speed of the division operation is slow and is unsuitable for a case in which the input voltage rapidly changes, a segment-based fitting manner is used herein.

It is assumed that a change range of the input voltage (Vin) is from 36 V to 100 V, the bit width of the EADC is 6 bits, and the bit width of the LUT is 6 bits.

(1) The input voltage value reference (Vin_ref) is set to 60 V. When the input voltage (Vin) changes, a corresponding gain coefficient should be 0.6 to 1.68. That is, when the input voltage value (Vin) is 60 V, the feedforward gain coefficient is 1. When a central value of the feedforward gain coefficient corresponds to the input voltage reference value (Vin_ref), the feedforward gain coefficient is 0.6 to 1.68 within the entire range of the input voltage (Vin), that is, 60/100=0.6, and 60/36=1.68. For another example, when the input voltage (Vin) is 48 V, the feedforward gain coefficient is 1.25, that is, 60/48=1.25.

(2) When an output of the EADC is a 6-bit signed number (ranging from −32 to 31), an appropriate divider ratio is selected for a peripheral circuit, and the input voltage (Vin) ensures when the input voltage (Vin) changes between 36 V and 100 V, an output result of the EADC is precisely between −32 and 31.

(3) The output of the EADC is used as the input of the LUT, and the table is referenced according to this input. The output of the LUT is a floating-point number with a bit width being 6 bits (64 results). The feedforward gain coefficient ranging from 0.6 to 1.68 may be configured as corresponding to each input of the LUT respectively.

When the input voltage (Vin) rapidly changes, the feedforward gain coefficient corresponding to the difference between the reference value (Vin) ref of the current input voltage and the first input voltage measurement value (Vin_eadc) may be rapidly output using the LUT. For example, when the difference between the input voltage reference value (Vin_ref) and the first input voltage measurement value (Vin_eadc) is 12 V, the feedforward gain coefficient acquired by looking up the LUT according to the 12 V is 1.25.

The SARADC 331 is configured to perform sampling on the input voltage (Vin) and perform quantization to obtain a digital signal value.

The Firmware 351 is configured to calculate a second feedforward gain coefficient according to the digital signal value of the SARADC 331, further compare the second feedforward gain coefficient and the feedforward gain coefficient of the current input voltage, if a difference is greater than a specific threshold, regulate, step by step, the feedforward gain coefficient of the current input voltage to the second feedforward gain coefficient by a minimum step, if the difference is less than the specific threshold, maintain the feedforward gain coefficient of the current input voltage unchanged. The feedforward gain coefficient may be stored in the feedforward gain coefficient register.

The firmware 351 is configured to read a program in a non-volatile memory and regularly execute the program. The execution period may be consistent with the sampling period of the SARADC or may also be an integral multiple of the sampling period of the SARADC. The non-volatile memory may include a read-only memory (ROM), a Flash, or an electrically erasable programmable read-only memory (EEPROM). The multichannel selector 322 is configured to select, according to the input voltage slope signal provided by the input voltage slope detection unit 321, whether the first feedforward gain of the LUT 341 or the second feedforward gain acquired through calculation by the firmware 351 as the feedforward gain coefficient of the current input voltage. The third control unit 36 is configured to multiply the feedforward gain coefficient of the input voltage selected by the multichannel selector 322 by the output value of the feedback loop of the output voltage to acquire a multiplication result, and convert the multiplication result to a DPWM control signal, thereby achieving control of stable output of the output voltage.

When the input voltage slowly changes:

The input voltage slope acquired by the EADC 311 by means of sampling is relatively small, and the feedforward gain of the LUT 341 is not used. The multichannel selector 322 selects the feedforward gain coefficient acquired through calculation by the periodically-executed firmware 351 as the feedforward gain of the current feedback loop. Because the second feedforward gain calculated by the firmware 351 is acquired by calculating the sampling result of the SARADC 331 and the SARADC 331 is a low-speed high-precision ADC, a sampling resolution of the SARADC 331 may reach a higher precision and be smaller than the least significant bit (LSB) that can be adjusted by the feedforward gain.

The periodically-executed firmware 351 uses the current feedforward gain coefficient to compare with the second feedforward gain coefficient. If the difference between the two is smaller than a certain threshold, the current feedforward gain coefficient still remains unchanged, otherwise, the current feedforward gain coefficient is regulated, step by step, by a minimum step of the feedforward gain according to the difference between the two coefficients until the difference between the two coefficients is less than a certain threshold. It can be seen that, the resolution of a feedforward gain change is no longer limited by the EADC 311 but depends on the minimum step of the feedforward gain. The resolution of the output voltage of the feedforward gain may be improved to suppress a slight fluctuation of the output voltage.

Further, the firmware 351 calculates a low-speed feedforward gain coefficient (that is, the second feedforward gain coefficient) according to the sampling result of the SARADC 331. Because an execution period of the firmware is long but a higher precision is required, the execution process includes the following: (1) select an input voltage reference (Vin ref), (2) Regularly read a sampling result (Vin_saradc) of the SARADC, and/or (3) calculate the slow-speed feedforward gain coefficient: FF_Gain_slow=(Vin ref/Vin_saradc)

In the embodiments of the present invention, the input voltage slope detection unit 321 may be implemented by hardware and the firmware 351 may be implemented by software. When it is determined using hardware that an input voltage rapidly changes, a multichannel selector selects an output of the LUT as an input of a feedforward gain coefficient register and meanwhile a write operation of the software is prohibited. In this way, when the input voltage rapidly changes, the hardware rapidly outputs the feedforward gain coefficient, not requiring the involvement of the software. When it is determined using hardware that the input voltage slowly changes, it needs to determine whether the software performs a write operation. If the software performs a write operation, the value of the software is used as the input of the feedforward gain coefficient register, otherwise, a current value of the feedforward gain coefficient register remains unchanged.

When the input voltage rapidly changes:

The input voltage slope acquired by the EADC 311 by means of sampling is larger. The multichannel selector 322 selects the feedforward gain coefficient output by the LUT 341 as the current feedforward gain coefficient.

Before the input voltage rapidly changes, the feedforward gain coefficient has been set to a value corresponding to the current input voltage by the periodically-executed firmware 351 and is substantially the same as the gain that the EADC 311 acquires by looking up the table using a sampling calculation result.

When the input voltage rapidly changes, no large output voltage overshoot is caused. When it is detected that the input voltage rapidly changes, the gain of the LUT 341 is immediately used to adapt to the change of the input voltage rapidly and the write operation of the firmware 351 is prohibited at the same time.

When the rapid change of the input voltage ends, if the firmware determines that the difference between the second feedforward gain and the current feedforward gain is greater than a certain threshold, the feedforward value is regulated step by step to the second feedforward gain by a minimum step to ensure that the feedforward gain does not change from the value looked up by the LUT to the second feedforward gain by a larger step, thereby suppressing a greater fluctuation of the output voltage, if the difference between the second feedforward gain and the current feedforward gain is less than a certain threshold, the current value still remains unchanged.

In the feedforward control apparatus provided by the embodiments of the present invention, when an input voltage rapidly changes, the input voltage is sampled by the EADC and a low-precision feedforward gain is acquired by looking up a table, so as to suppress a rapid change of the input voltage, when the input voltage slowly changes, the channel selector selects the periodically-executed firmware as a feedforward channel, and the firmware calculates a higher-precision feedforward gain according to the high-precision input voltage value acquired through sampling and calculating by the SARADC, thereby suppressing a voltage fluctuation when the input voltage slowly changes.

In addition, the feedforward control apparatus provided by the embodiments of the present invention uses less hardware and avoids using the high-precision analog-to-digital converter only, thereby effectively and simply resolving a disturbance suppression problem. Especially, various input slope variation scenarios of a 48 V busbar power supply are taken into account. An application scope is wide and an actual effect is obvious.

It should be noted that the apparatus embodiment described above is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. In addition, in the accompanying drawings of the apparatus embodiments provided by the present invention, connection relationships between modules indicate that the modules have communication connections in between, which may be implemented as one or more communications buses or signal cables. A person of ordinary skill in the art can understand and implement the foregoing embodiments without creative efforts.

Through the description of the foregoing embodiments, a person skilled in the art can clearly understand that the present invention may be implemented by computer software plus necessary universal hardware, and certainly may also be implemented by dedicated hardware such as a dedicated integrated circuit, a dedicated central processing unit (CPU), a dedicated memory, and a dedicated component. In general, all functions to be performed by a computer program (or referred to as computer software) can be easily implemented using corresponding hardware. Moreover, specific hardware structures used to implement the same function may also be varied, for example, an analog circuit, a digital circuit, or a dedicated circuit. The computer software product may be stored in a readable storage medium such as a computer floppy disk, a universal serial bus (USB) flash drive, a removable hard disk, a ROM, a random access memory (RAM), a magnetic disk, or an optical disc, where the storage medium includes several instructions for enabling a computer device (such as a personal computer, a server, or a network device) to perform the method described in each embodiment of the present invention.

The foregoing descriptions are merely exemplary embodiments of the present invention, but are not intended to limit the protection scope of the present invention. Any variation or replacement readily figured out by a person skilled in the art within the technical scope disclosed by the present invention shall fall within the protection scope of the present invention. Therefore, the protection scope of the present invention shall be subject to the protection scope of the claims.

What is claimed is:

1. A feedforward control method, comprising:
    determining whether an input voltage rapidly changes or slowly changes, according to a difference between an input voltage reference value and an input voltage measurement value acquired by a high-speed low-precision analog-to-digital converter by means of periodic sampling;
    determining, from an information table, a first feedforward gain coefficient corresponding to the difference between the input voltage reference value and a first input voltage measurement value acquired by the high-speed low-precision analog-to-digital converter in a current sampling period when it is determined that the input voltage rapidly changes;
    determining a second feedforward gain coefficient corresponding to a ratio of the input voltage reference value to a second input voltage measurement value acquired by a low-speed high-precision analog-to-digital converter in the current sampling period when it is determined that the input voltage slowly changes;
    using the first feedforward gain coefficient or the second feedforward gain coefficient as a feedforward gain coefficient of a current input voltage;
    multiplying the feedforward gain coefficient of the current input voltage by an output value of a feedback loop of an output voltage to acquire a multiplication result; and
    converting the multiplication result to a control signal to control stable output of the output voltage.

2. The feedforward control method according to claim 1, wherein determining whether the input voltage rapidly changes or slowly change comprises:
    periodically sampling, by the high-speed low-precision analog-to-digital converter, the input voltage, and acquiring the corresponding input voltage measurement value in each sampling period;
    calculating the difference between the input voltage reference value and the input voltage measurement value corresponding to each sampling period;
    performing a difference calculation on the difference of the current sampling period and the difference of a previous sampling period to acquire a difference calculation result;
    determining that the input voltage rapidly changes when an absolute value of the difference calculation result is greater than a first threshold; and
    determining that the input voltage slowly changes when the absolute value of the difference calculation result is less than or equal to the first threshold.

3. The feedforward control method according to claim 1, further comprising:
    performing a difference calculation on the second feedforward gain coefficient and the feedforward gain coefficient of the current input voltage to acquire a difference calculation result; and
    regulating, step by step, the feedforward gain coefficient of the current input voltage to the second feedforward gain coefficient by a minimum step when an absolute value of the difference calculation result is greater than a second threshold, to make a difference between the feedforward gain coefficient of the current input voltage and the second feedforward gain coefficient less than or equal to the second threshold; and maintaining the feedforward gain coefficient of the current input voltage unchanged when the absolute value of the difference calculation result is less than or equal to the second threshold.

4. The feedforward control method according to claim 1, further comprising:

performing a difference calculation on the second feedforward gain coefficient and the feedforward gain coefficient of the current input voltage to acquire a difference calculation result; and regulating, step by step, the feedforward gain coefficient of the current input voltage by a minimum step when an absolute value of the difference calculation result is greater than a second threshold, to make a difference between the feedforward gain coefficient of the current input voltage and the second feedforward gain coefficient less than or equal to the second threshold; and maintaining the feedforward gain coefficient of the current input voltage unchanged when the absolute value of the difference calculation result is less than or equal to the second threshold.

5. The feedforward control method according to claim 1, wherein a sampling period of the high-speed low-precision analog-to-digital converter is shorter than a sampling period of the low-speed high-precision analog-to-digital converter.

6. The feedforward control method according to claim 1, wherein the high-speed low-precision analog-to-digital converter comprises an error analog-to-digital converter (EADC).

7. The feedforward control method according to claim 1, wherein the low-speed high-precision analog-to-digital converter comprises a successive approximation register analog-to-digital converter (SARADC).

8. The feedforward control method according to claim 1, wherein the high-speed low-precision analog-to-digital converter comprises a pipeline analog-to-digital converter (ADC).

9. The feedforward control method according to claim 1, wherein the low-speed high-precision analog-to-digital converter comprises a Sigma-Delta analog-to-digital converter ($\Sigma$-$\Delta$ ADC).

10. A feedforward control apparatus, comprising:

a high-speed low-precision analog-to-digital converter configured to periodically sample an input voltage to acquire a measurement value of the input voltage, and to acquire a first input voltage measurement value in a current sampling period by means of sampling;

a determining unit, connected to the high-speed low-precision analog-to-digital converter and configured to determine whether the input voltage rapidly changes or slowly changes, according to a difference between an input voltage reference value and the input voltage measurement value acquired by the high-speed low-precision analog-to-digital converter by means of periodical sampling;

a first control unit, connected to the determining unit and the high-speed low-precision analog-to-digital converter and configured to determine, from an information table, a first feedforward gain coefficient corresponding to the difference between the input voltage reference value and the first input voltage measurement value acquired by the high-speed low-precision analog-to-digital converter in the current sampling period when it is determined that the input voltage rapidly changes;

a low-speed high-precision analog-to-digital converter, connected to a second control unit and configured to acquire a second input voltage measurement value in the current sampling period by means of sampling;

the second control unit, connected to the determining unit and the low-speed high-precision analog-to-digital converter and configured to determine a second feedforward gain coefficient corresponding to a ratio of the input voltage reference value to the second input voltage measurement value acquired by the low-speed high-precision analog-to-digital converter in the current sampling period when it is determined that the input voltage slowly changes; and a third control unit, connected to the first control unit and the second control unit, and configured to:

use the first feedforward gain coefficient or the second feedforward gain coefficient as a feedforward gain coefficient of a current input voltage, multiply the feedforward gain coefficient of the current input voltage by an output value of a feedback loop of an output voltage to acquire a multiplication result, and convert the multiplication result to a control signal to control stable output of the output voltage.

11. The feedforward control apparatus according to claim 10, wherein the determining unit is configured to:

calculate a difference between the input voltage reference value and a measurement value of an input voltage corresponding to each sampling period, wherein the measurement value of the input voltage corresponding to each sampling period is acquired by the high-speed low-precision analog-to-digital converter by means of periodically sampling the input voltage;

perform a difference calculation on the difference in the current sampling period and the difference in a previous sampling period to acquire a difference calculation result;

determine that the input voltage rapidly changes when an absolute value of the difference calculation result is greater than a first threshold; and determine that the input voltage slowly changes when the absolute value of the difference calculation result is less than or equal to the first threshold.

12. The feedforward control apparatus according to claim 10, wherein the second control unit is configured to:

perform a difference calculation on the second feedforward gain coefficient and the feedforward gain coefficient of the current input voltage to acquire a difference calculation result; and regulate, step by step, the feedforward gain coefficient of the current input voltage to the second feedforward gain coefficient by a minimum step when an absolute value of the difference calculation result is greater than a second threshold, to make a difference between the feedforward gain coefficient of the current input voltage and the second feedforward gain coefficient less than or equal to the second threshold; and maintain the feedforward gain coefficient of the current input voltage unchanged when the absolute value of the difference calculation result is less than or equal to the second threshold.

13. The feedforward control apparatus according to claim 10, wherein the second control unit is configured to:

perform a difference calculation on the second feedforward gain coefficient and the feedforward gain coefficient of the current input voltage to acquire a difference calculation result; and regulate, step by step, the feedforward gain coefficient of the current input voltage by a minimum step when an absolute value of the difference calculation result is greater than a second threshold, to make a difference between the feedforward gain coefficient of the current input voltage and the second feedforward gain coefficient less than or equal to the second threshold; and maintain the feedforward gain coefficient of the current input voltage unchanged when the absolute value of the difference calculation result is less than or equal to the second threshold.

14. The feedforward control apparatus according to claim 10, wherein a sampling period of the high-speed low-precision analog-to-digital converter is shorter than a sampling period of the low-speed high-precision analog-to-digital converter.

15. The feedforward control apparatus according to claim 10, wherein the high-speed low-precision analog-to-digital converter comprises an error analog-to-digital converter EADC.

16. The feedforward control apparatus according to claim 10, wherein the high-speed low-precision analog-to-digital converter comprises a pipeline analog-to-digital converter (ADC).

17. The feedforward control apparatus according to claim 10, wherein the low-speed high-precision analog-to-digital converter comprises a successive approximation register analog-to-digital converter (SARADC).

18. The feedforward control apparatus according to claim 10, wherein the low-speed high-precision analog-to-digital converter comprises a Sigma-Delta analog-to-digital converter ($\Sigma$-$\Delta$ ADC).

* * * * *